Sept. 20, 1971   C. H. TOWNES ET AL   3,606,522
OPTICAL FREQUENCY WAVEGUIDE AND TRANSMISSION SYSTEM
Original Filed Oct. 11, 1965                    4 Sheets-Sheet 1
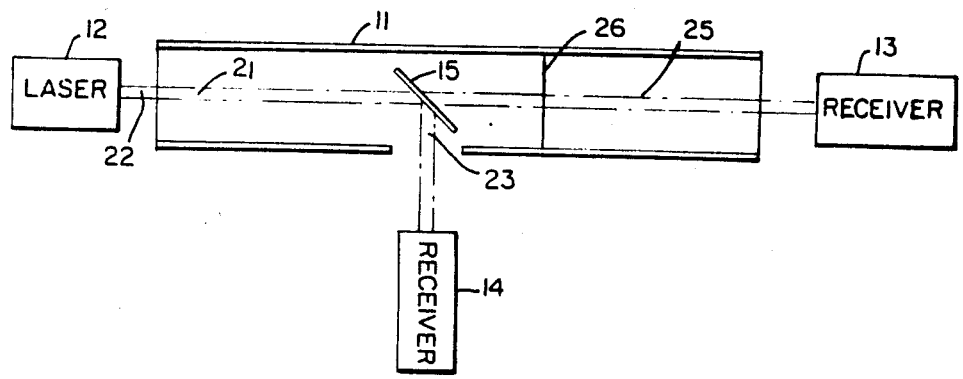
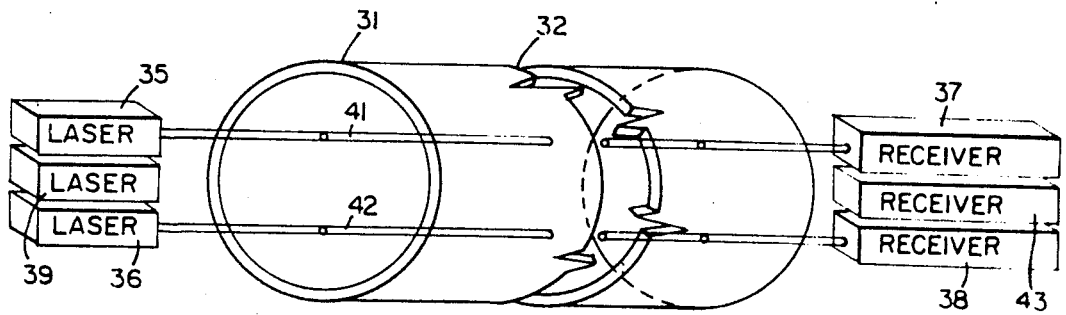
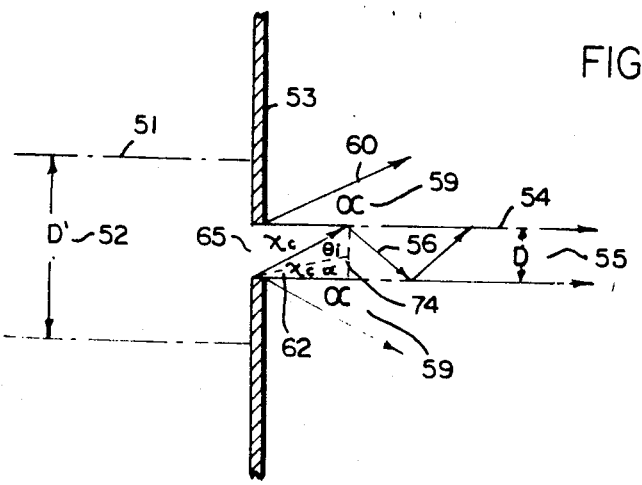
INVENTORS:
CHARLES H. TOWNES
RAYMOND Y. CHIAO
ELSA M. GARMIRE
BY,
ATTORNEY

INVENTORS:
CHARLES H. TOWNES
RAYMOND Y. CHIAO
ELSA M. GARMIRE

BY,

ATTORNEY

TABLE OF COEFFICIENTS FOR NONLINEAR INDEXES OF REFRACTION $n_2$ AND THE CRITICAL POWER LEVELS P FOR SELF-TRAPPING. INDEXES OF REFRACTION = $n_0 + n_2 E^2$, WHERE E IS IN ESU.

| MATERIAL | $n_2 \times 10^{13}$ (KERR EFFECT)[a] A | $n_2 \times 10^{13}$ (KERR EFFECT)[a] B | $n_2 \times 10^{13}$ (ELETROSTRICTION)[b] | P (ELETROSTRICTION) (MW) |
|---|---|---|---|---|
| CARBON DISULFIDE | 180 | 18 | 18 | 0.2 |
| BENZENE | 49 | | 13 | 0.25 |
| WATER | | 0.13 | 2 | 1 |
| AIR (1 ATMOSPHERE) | | | 0.041 | 80 |
| (100 ATMOSPHERE) | | | 4.1 | 0.8 |
| GLASS (HEAVY SILICATE FLINT) | | | 0.9 | 4 |
| CALCITE | | | 0.8 | 4 |
| SAPHIRE | | | 0.2 | 20 |

[a] DETERMINED FROM: (A) G. MAYOR AND F. GIRES, COMPT. REND. 258, 2039 (1964); (B) P.D. MAKER, R.W. TERHUNE, AND C.M. SAVAGE, PHYS. REV. LETTERS 12, 507 (1964).
[b] AND B DETERMINED FROM INTERNATIONAL CRITICAL TABLES (MC GRAW-HILL BOOK CO. INC., NEW YORK (1929)

FIG. 6

INVENTORS:
CHARLES H. TOWNES
RAYMOND Y. CHIAO
ELSA M. GARMIRE

BY,
*Richard F. Benway*
ATTORNEY

United States Patent Office 3,606,522
Patented Sept. 20, 1971

3,606,522
OPTICAL FREQUENCY WAVEGUIDE AND TRANSMISSION SYSTEM
Charles H. Townes, Cambridge, Raymond Y. Chiao, Boston, and Elsa M. Garmire, Cambridge, Mass., assignors to the United States of America as represented by the Administrator of the National Aeronautics and Space Administration
Original application Oct. 11, 1965, Ser. No. 494,739, now Patent No. 3,556,634, dated Jan. 19, 1971. Divided and this application Jan. 24, 1969, Ser. No. 822,089
Int. Cl. G02b 5/14, 27/14
U.S. Cl. 350—171                                   10 Claims

ABSTRACT OF THE DISCLOSURE

A method and system of transmitting and distributing optical frequency radiation are disclosed. The power level of the radiation beam is maintained at a level which is a function of the pressure and dielectric constant of a gas through which the beam is transmitted. The beam through the gas generates its own waveguide to prevent beam divergence through the gas.

---

Figure 4:
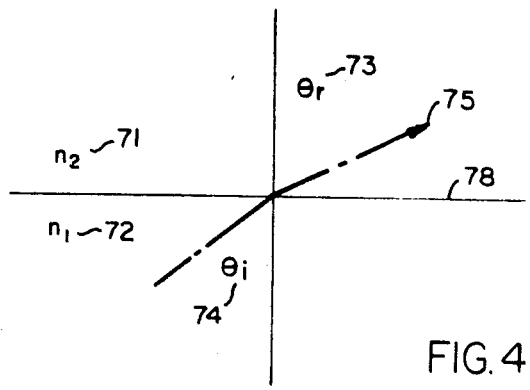

The invention described herein relates to a transmission method and system and is a division of copending patent application entitled "Optical Frequency Waveguide," Ser. No. 494,739 filed Oct. 11, 1965, now Pat. No. 3,556,634 issued Jan. 19, 1971.

This invention relates to waveguides, and more particularly to an optical frequency waveguide that is self-generating.

A beam of electromagnetic radiation when launched and directed through any material necessarily diffracts. Beam spreading, which results from diffraction, between source and receiver limits achievable power density appearing at the receiver and prevents very small beam transmission even over short distances. The subject therefor of the present invention is diffractionless transmission of electromagnetic radiation by forming a dielectric waveguide between source and receiver. Diffractionless transmission finds application in power transmission, communication, bloodless surgery, machinery, and many other fields of endeavor.

Transmitting large quantities of electric power requires rather substantial transmission systems. Low frequency transmission necessarily involves operating at elevated voltages which produce losses due to corona. Direct current transmission of power also involves losses due to resistance heating. Power transmission can be accomplished at optical frequencies with minimal losses and is the subject of the present invention.

Optical frequency energy cannot be transmitted through the atmosphere for two obvious reasons. First, the possibility exists that someone or something such as an aircraft could intercept the beam. Such an interceptor would be seriously injured or even destroyed. Second, atmospheric berrations, due to changing weather conditions and the like, could cause the beam of optical frequency energy to be diffracted such that the energy would be directed to some unwanted target causing damage and interrupting power transmissions. In either event, it would be unsafe to transmit optical energy through the atmosphere. An immediate suggestion would then be to confine the beam of energy within a pipe or other safe medium, such as a fibre optical or light pipe.

Light pipes could not be used for the transmission of large quantities of energy because the material from which the pipe is made is lossy and would seriously attenuate the beam and might even melt. Furthermore, it would be nearly impossible to make a flawless (flaws cause reflection or absorb energy, which in turn produces local heating that may melt the pipe) light pipe of any appreciable length, such as twenty feet, let alone several miles. If such a pipe could be fabricated, it would soon develop fatal defects of crazing or cracking and such material does not lend itself to splicing in the field. At the junction of two sections reflections would result. The present invention, on the other hand, provides a safe medium to transport large quantities of optical frequency power with negligible loss. Furthermore, with the transmission vehicle being a gas, such a system lends itself to easy repair and in many instances is self-repairing (i.e. if the gas overheats or ionizes within the beam, it will be quickly replaced by the remaining gas in the system).

For the same reasons enumerated above, communication links utilizing optical frequencies must also be conducted over a medium which the present invention provides. Additionally, the present invention permits several such communication links to be conducted over a single structure; for that matter, a power link and several communication links may be conducted over a single structure.

Drawing a comparison between the present invention and comparable microwave waveguides, it is apparent that substantial savings can be realized with the present invention, for the elaborate machining, polishing, and even plating necessary in microwave components is obviated.

In applications where lasers have been employed, such as surgery and fine machining, to cut with a powerful beam, the laser as located very close to the target area to avoid diffraction. With the present invention, the laser can be placed quite remote from the target area yet will permit higher power densities and smaller beam width. This latter feature will permit greater freedom of movement in the work area and will also permit a single laser to power several work areas at the same time.

Therefore, an object of this invention is to provide a safe optical frequency waveguide.

Another object of the present invention is to provide an optical frequency power transmission system.

Another object of this invention is to provide a multichannel optical frequency waveguide structure.

Another object of this invention is to provide a low loss optical frequency waveguide.

Another object of this invention is to provide a relatively indestructible transmission medium for optical energy.

Another object of the present invention is to provide an optical frequency power transmission system.

Another object of the present invention is to provide an optical frequency power distribution system.

Another object of this invention is to provide a waveguide capable of handling very high quantities of optical energy.

Another object of this invention is to provide an optical frequency waveguide that effectively eliminates the conduction of unwanted low frequency signals.

Another object of the present invention is to provide a combination power and communication transmission system.

Another object of the present invention is to provide an optical frequency bloodless surgical cutting and cell destroying system.

Another object of the present invention is to provide an optical frequency machining, drilling, and cutting tool.

Figure 5:
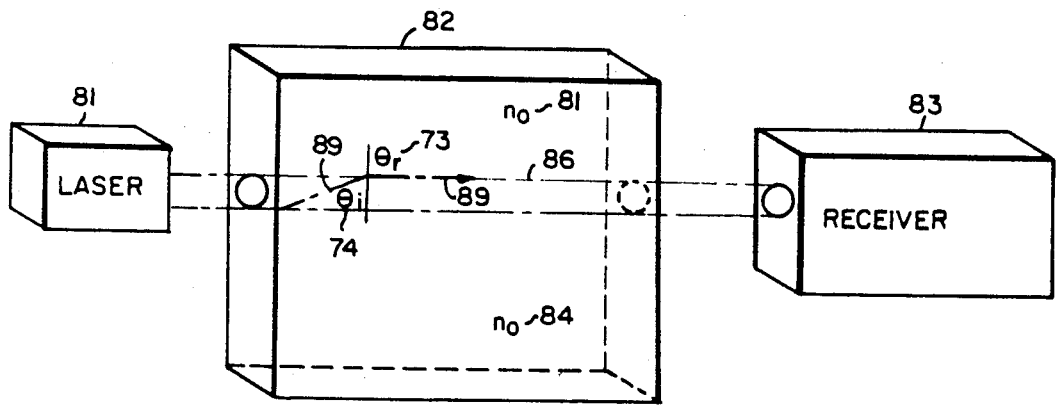
Figure 7:
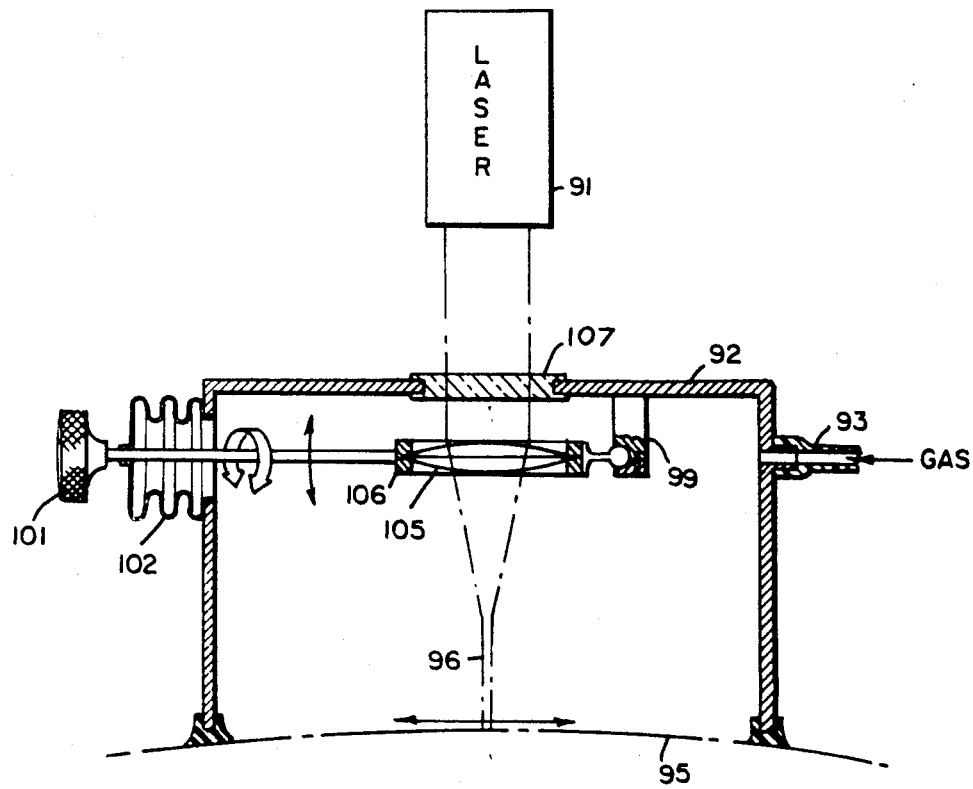

Other objects and features of the present invention will be better understood from the following specification when read in connection with the attached drawings of which FIG. 1 shows an optical waveguide power transmission system. FIG. 2 shows an optical frequency multi-channel transmission system. FIG. 3 shows a light beam of diameter D with its associated angles of dispersion. FIG. 4 shows diffraction of a ray as it strikes the boundary between materials of differing indices of refraction. FIG. 5 shows a laser directing a beam of optical energy through a slab of homogeneous material and emerging therefrom. FIG. 6 is a table of critical power and related factors computed for various materials. FIG. 7 is a laser bloodless surgical cutting device.

An electromagnetic beam of optical frequency of sufficient power and proper diameter when directed into a dielectric medium will produce its own dielectric waveguide and will propagate through said dielectric without spreading. This will occur in materials in which the dielectric constants increase with field intensity but which are commonly homogeneous in the absence of said electromagnetic radiation.

Referring to FIG. 5, a laser 81 produces a high intensity beam 86, which is directed through a slab of material 82, which can be solid, liquid, or gaseous, as will be described more fully as we proceed. The material within the confines of the beam undergoes certain changes due to the field produced by the laser beam. The material has a uniform dielectric constant $n_0$ 84, in absence of an electric field. However, within the confines of the beam, the dielectric constant increases to some value larger than $n_0$ due to the electric field. This causes effectively a tube of material with a higher dielectric constant to develop within the original material corresponding (having a shape and diameter) to that of the electromagnetic beam. Rays of energy 89 within the beam will hit the edges of this tube at the point of transition in the material having the higher dielectric constant to that area having the lower dielectric consant and is refracted such that all of the energy within the beam is constantly reflected from the sides of the tube formed by the beam. Therefore, this tube forms a waveguide which directs the energy within the beam and contains it therein. Summarily speaking, electromagnetic energy disturbs the dielectric constant of the material, causing the dielectric material to form a waveguide which traps the beam of electromagnetic energy.

The principles upon which the waveguide is formed and persists can be better understood from its mathematical development. Starting this development we have Snell's Law, which is $$n_i \sin \theta_i = n_r \sin \theta_r \qquad (1)$$

In FIG. 4 we see a ray of light 75 passing through one medium having a dielectric constant of $n_i$ 72 through a junction 78 with another material having a dielectric constant $n_r$ 78 and the beam is refracted. Angle of incidence $\theta_i$ 74 and angle of refraction $\theta_r$ 83 results. Equation #1 summarizes this relationship. When the angle of refraction 73 becomes 90°, as shown in FIG. 5, the ray is totally reflected within the beam. When $\theta_r = 90°$, then $\sin \theta_r = 1$, and by substitution we have:

$$n_i \sin \theta_i = n_r \qquad (2)$$

Equation 2 can be simplified by dividing both sides of the equation by $n_i$ and we have:

$$\sin \theta_i = \frac{n_r}{n_i} \qquad (3)$$

Relating the latter equation to our system of self-generating waveguide as we have, $n_r = n_0$, the index of refraction of the entire homogeneous material. Furthermore, we know the material within the waveguide will have an index of refraction something greater than $n_0$, which we will find to be $n_0 + n_2 E^2$, therefore $n_i = n_0 + n_2 E^2$. The index of refraction is affected by the square of the field illuminating it and a factor, $n_2$, which we will find later is largely due to electrostriction. We will have the following equation by substituting the above values in Equation #3:

$$\sin \theta_i = \frac{n_0}{n_0 + n_2 E^2} \qquad (4)$$

Referring to FIG. 3, we have a beam of electromagnetic energy of diameter D′ 52 shining upon a plane 53 having an opening 65 and a beam of diameter D 55 emerges therefrom. We note that this beam has an angle of diverence $\alpha$ which is designated 59. This angle of divergence $\alpha$ appears in any electromagnetic wave in air, but FIG. 3 serves to illustrate this more effectively. If a ray 56 is parallel to a line 60 which forms the angle of divergence 59 with the beam 54, it will form an angle of incidence 74 with the normal and an angle $\psi$ critical which is its complement. For the purposes of our development, we can see that:

$$\alpha = \frac{\lambda}{D} \qquad (5)$$

We can determine from the examination of FIG. 3 that the beam of finite diameter D 55 has an angle of diffraction $\alpha$. If we can maintain a ray 56 within the beam such that it will have an angle $\psi$ critical, which is greater than $\alpha$, then the angle of incidence $\theta_i$ 74 will be such that ray 56 will be reflected back into and remain within beam 54.

In FIG. 3, $\alpha$ and $\theta_i$ being complementary angles then:

$$\cos \alpha \geq \cos \psi_c \qquad (6)$$

Knowing also that $\cos \psi_c = \sin \theta_i$ by substitution:

$$\cos \alpha > \sin \theta_i \qquad (7)$$

By expansion we have:

$$\cos \alpha = 1 - \frac{\alpha^2}{2} + \text{some insignificant terms} \qquad (8)$$

This is the result of our assumption that $\alpha$ is much less than 1. Substituting Equations 9, 8, and 4, we have:

$$1 - \frac{\alpha^2}{2} > \frac{n_0}{n_0 + n_2 E^2} \qquad (9)$$

We note further the following equation obtains:

$$\frac{n_0}{n_0 + n_2 E^2} \approx 1 - \frac{n_2}{n_0} E^2 \qquad (10)$$

if $n_2 E^2 \ll n_0$. Also:

$$1 - \frac{\alpha^2}{2} > 1 - \frac{n_2}{n_0} E^2 \qquad (11)$$

can be reduced down and the signs reversed such that:

$$\frac{n_2}{n_0} E^2 > \frac{\alpha^2}{2} \qquad (12)$$

Rearranging terms again, we have:

$$E^2 > \frac{n_0}{n_2} \alpha_2^2 \qquad (13)$$

The E in Equation 14 now represents the critical field which will result in self-trapping of rays that make up the finite beam which we wish to contain within its own waveguide.

Proceeding a step further, we must now have a power corresponding to this critical field. Such a critical power would be equal to the product of the beam area times the Poynting vector of the field times the speed of light C. The area is represented by $\pi D^2/4$ and the Poynting vector of the field is then the field $E^2/8\pi$. The following Equation 14 represents the flow of power and the area presupposes that we have a uniform distribution of power which is approximately correct and satisfactory for this expression. We therefore have:

$$P_c = \frac{\pi D^2}{4} \cdot \frac{n_0 E^2}{8\pi} \cdot C \qquad (14)$$

The critical power by substituting E of Equation 14 reduces to:

$$P_c = \frac{D^2 n_0 c}{32} \cdot \frac{n_0 \alpha^2}{n_2 \cdot 2} \qquad (15)$$

Substituting in Equation 16

$$\alpha = \frac{1.22 \lambda}{n_0 D}$$

in which: $\lambda$ is the wavelength, $n_0$ is the dielectric constant of the material, and D is the diameter of the beam, we further reduce:

$$P_c = \frac{D^2 n_0^2 C}{64 n_2} \cdot \left(\frac{1.22\lambda}{n_0 D}\right)^2 \qquad (16)$$

to that of:

$$P_c = (1.22\lambda)^2 \frac{C}{64 n_2}. \qquad (17)$$

Equation 18 is an approximation which conforms very closely to more precise machine calculation. Indications are that a beam above a certain critical power, $P_c$, will be trapped at a preselected diameter and not spread. This power level decreases with the square of the wavelength. For normal dielectric materials, the constant $n_2$ is such that the critical power for trapping is within one or two orders of magnitude at $10^6$ for visible light, a power level commonly obtained in laser beams. For radio waves the longer wavelength makes the critical power for such materials unattainable at present.

The nonlinear coefficient $n_2$ is associated with high frequency Kerr effects involving molecular orientation with electrostriction, and with nonlinearities due to electronic polarizability of the type which generates third harmonic waves in optical materials. For liquids, the first two effects are of comparable size and the third much smaller, as is indicated in the table of FIG. 6. For solids, such molecular rotation is frozen out and electrostrictive effects dominate.

The beam when once trapped establishes a waveguide of appropriate characteristics for its own conduction, any weak wave of higher frequency can also easily be shown to be conducted but not one of lower frequency. The dielectric properties of the waveguide are undisturbed to first order in the weak fields as long as the beat frequency between it and the initial wave is too high for the dielectric to respond. If the beat frequency is lower, then one has a waveguide of modulated dielectric constant and solutions for the two simultaneous waves are very complicated. This latter feature illustrates that a waveguide can be established by a very strong continuous beam and that comparatively weak signals of a higher frequency are conducted through that waveguide. Consequently, a waveguide can be generated by one transmitter, while a second smaller transmitter is utilized for modulation and transmission of intelligence over that waveguide.

Two waves whose frequency differences are too high for the dielectric response are more stably trapped than is a wave of a single frequency. This results from the increase in dielectric constants of the waveguide produced by one wave which helps form the waveguide and is relatively unaffected by small perturbations of the second wave and vice versa.

The table of FIG. 6 gives values for $n_2$ for Kerr and for electrostrictive effects, and a critical power calculated for electrostrictive effects alone. For Kerr effects, $$n_2 = 2/3 \lambda J$$

where J is the high frequency Kerr constant due to molecular rotation. For electrostriction, $$n_2 = \frac{\lambda^2}{16 n_0 B}$$

where $$\lambda = \frac{\rho d G}{d\rho}$$

is the density, B is the bulk modulus, and G is conductance.

Referring to FIG. 1, we see a laser beam trapped within a medium contained with a pipe 11. The laser 12 transmits energy to receivers 13 and 14, thus illustrating a power distribution system. Some beam energy is tapped off by beam splitter 15. The beam 21 breaks up into components 25 and 23. The first component of the beam travels to receiver 13, while the second travels to receiver 14. It must be noted again, however, that the energy of the beam 25, if it must continue any distance, must remain above the critical power, $P_c$, as outlined in the equations, to continue to have its ability for self-trapping and thereby form its own waveguide.

Ordinarily power levels will be far above critical power levels and the following techniques will be rendered unnecessary. However, communications systems where power levels may be slightly above critical power may require some correction. The gas pressure can be increased to reinstate self-trapping, which will be amplified further in subsequent paragraphs. Increasing the gas pressure on the other side of partition 26 will permit beam 25 to continue without spreading.

Referring to FIG. 2, we see a communications system utilizing a single structure or effectively a system of dielectric waveguides. Lasers 35, 39, and 36 transmit through a pipe 31 to receivers 37, 43, and 38. We note that laser 35 forms a beam 41 which produces its own waveguide and continues through to receiver 37. Laser 39 is inactive and produces no beam and no resulting waveguide. Laser 36 produces beam 42 which effectively creates its own waveguide and continues to receiver 38. The particular advantage here is that hazardous conditions of transmitting high powered laser signals are avoided by means of pipe 31. Furthermore, individual laser beams are not dispersed and do not intermodulate with one another, even though they travel a substantial distance. Obviously, a substantial number of independent channels can be sent over a common structure.

The structure of both embodiments above is preferably a gas-filled steel pipe. The requisite power is very sensitive to pressure, as can be seen from an examination of the table of FIG. 6. Here we see that power required for self-trapping in air at one atmosphere pressure is one hundred times greater than that required for self-trapping in air at a pressure of one hundred atmospheres. It is suggested that carbon dioxide ($CO_2$) because it has a more favorable index of refraction be used under a pressure of 100 atmospheres. However, the pressure of the gas is a function of beam power. When the beam power is high the pressure should be low, and vice versa. In a distribution system, the main trunk line should have a gas pressure as low as one atmosphere and the branch lines should have a gas pressure a high as one hundred atmospheres. The lower the gas pressure, the lower the power absorption is. The absorption of power of a gas, even at its higher pressure, is negligible when compared to that of a solid or even a liquid.

Pulsed ruby lasers readily produce the power required for transmission; but this power is pulsed and average power transmission is consequently very low. An array of gallium arsenide lasers together with a proper fiber-optics system for gathering the power from each beam and ultimately necking the beam down until a very intense continuous light beam is produced. The receiver for the power system can be any photovoltaic substance such as lead sulfide; but again an array of gallium arsenide diodes which have a higher quantum efficiency and would therefore be more desirable. Use of lasers is not essential, for the coherence and polarization are not necessary to effective operation. White light if it had adequate total power could also be used effectively and can be obtained from a power flash tube or equivalent device.

Referring to FIG. 7, laser 91 directs optical frequency energy through window 107 into pressure tight container 92. Lens 105 is in the path of said laser beam and is installed in movable lens holder 106 pivoted about pedestal 99 attached to container 92. Lens holder 106 can be turned by handle 101, or can be rotated about pedestal 99, thus being able to cause beam 96 to traverse the entire target 95. Bellows 102 maintains container 92 pressure tight while lens holder 106 is raised up and down. Gas, such as carbon dioxide, fills chamber 92 at a pressure of 100 atmospheres by way of inlet 93.

Lens 106 concentrates the optical frequency beam emanating from laser 91 to a focal point midway between lens 106 and target 95. Intense beam 96 of self-trapped optical frequency radiation is thereby formed. Target 95 can be a patient's body ready to be incised, beam 96 acting as a surgical knife.

The above system can be readily adapted to machining. Micrometer control of the lens system would have to be introduced. It should be noted here that power density of the beam and critical power for self-trapping are distinct from one another. Examining Equation 18, critical power can be preselected relative to wave-length, beam diameter and so forth, such that a sufficiently high power density for the purpose of cutting is obtained. In other cases such as power transmission, power density should be kept low in order to minimize heating.

While we have described the above principles of our invention in connection with specific apparatus, it is to be clearly understood that this description is only made by way of example and not as a limitation on the scope of our invention as set forth in the objects thereof and in the accompanying claims.

What is claimed is:
1. The method of transmitting optical frequency radiation between a source and a prescribed target comprising the steps of,
    selecting a powerful electromagnetic radiation source having preselected frequency components,
    shaping the energy emanating from said powerful source,
    maintaining the total power of said shaped beam in accordance with a predetermined magnitude, and
    interposing between said preselected source and prescribed target material having a dielectric constant at a pressure which is a function of the magnitude of the power of said beam to establish self-trapping of said beam.
2. A method of transmitting optical frequency radiation between a source and a prescribed target according to claim 1 wherein said source of electromagnetic radiation is at least one laser.
3. The arrangement as recited in claim 2 wherein said material of preselected dielectric constant is of uniform density.
4. A method of transmitting optical frequency radiation between a source and a prescribed target according to claim 1 wherein said source of electromagnetic radiation is a flash tube producing substantially white light.
5. The arrangement as recited in claim 4 wherein said material of preselected dielectric constant is of uniform density.
6. The arrangement as recited in claim 1 wherein said material of preselected dielectric constant is of uniform density.
7. An optical frequency power transmission and distribution system comprising:
    laser means for generating a beam of electromagnetic energy,
    a pressure-tight structure for directing said electromagnetic energy generated by said laser means,
    a preselected gas filling said structure,
    receiving means stationed at preselected points along said structure,
    beam-splitting means for diverting energy from said beam to preselected receiving means,
    transparent partitioning means for dividing said structure into prescribed compartments, and
    pressure regulating means for maintaining the gas in each compartment at a predetermined pressure which is a function of the power of the beam entering the compartment to establish self-trapping of said beam.
8. The arrangement as recited in claim 7 wherein said gas in each compartment is of uniform density.
9. The arrangement as recited in claim 8 wherein said gas is carbon dioxide.
10. The arrangement as recited in claim 9 wherein said gas in each compartment is of uniform density.

References Cited
UNITED STATES PATENTS

| | | | |
|---|---|---|---|
| 3,107,296 | 10/1963 | Hine | 350—212X |
| 3,404,350 | 10/1968 | Muncheryan | 350—96BX |
| 3,415,588 | 12/1968 | Berreman | 350—179X |

JOHN K. CORBIN, Primary Examiner

U.S. Cl. X.R.

350—96WG, 160R